(12) United States Patent
Wrabel et al.

(10) Patent No.: US 8,807,955 B2
(45) Date of Patent: Aug. 19, 2014

(54) ABRASIVE AIRFOIL TIP

(75) Inventors: Peter Wrabel, Windsor Locks, CT (US);
Peter J. Draghi, Simsbury, CT (US);
Shawn J. Gregg, Wethersfield, CT (US);
Timothy P. Murphy, Suffield, CT (US)

(73) Assignee: United Technologies Corporation, Hartford, CT (US)

( * ) Notice: Subject to any disclaimer, the term of this patent is extended or adjusted under 35 U.S.C. 154(b) by 520 days.

(21) Appl. No.: 13/215,897

(22) Filed: Aug. 23, 2011

(65) Prior Publication Data
US 2013/0004328 A1 Jan. 3, 2013

Related U.S. Application Data

(60) Provisional application No. 61/503,258, filed on Jun. 30, 2011.

(51) Int. Cl.
*F01D 5/14* (2006.01)

(52) U.S. Cl.
USPC ...................................... 416/241 R

(58) Field of Classification Search
USPC ................... 416/228, 241 R, 223 R, 174, 224;
415/170.1, 173.4, 14.4; 29/889.1
See application file for complete search history.

(56) References Cited

U.S. PATENT DOCUMENTS

| | | | | |
|---|---|---|---|---|
| 4,118,147 A * | 10/1978 | Ellis | | 416/230 |
| 4,269,903 A * | 5/1981 | Clingman et al. | | 428/591 |
| 4,390,320 A | 6/1983 | Eiswerth | | |
| 4,623,087 A * | 11/1986 | Conolly | | 228/176 |
| 4,808,055 A * | 2/1989 | Wertz et al. | | 416/224 |
| 5,209,645 A * | 5/1993 | Kojima et al. | | 416/241 B |
| 5,476,363 A * | 12/1995 | Freling et al. | | 415/173.1 |
| 5,551,840 A * | 9/1996 | Benoit et al. | | 416/241 B |
| 5,603,603 A | 2/1997 | Benoit et al. | | |
| 5,665,217 A | 9/1997 | Gruver et al. | | |
| 5,972,424 A | 10/1999 | Draghi et al. | | |
| 6,060,174 A * | 5/2000 | Sabol et al. | | 428/610 |
| 6,203,847 B1 * | 3/2001 | Conner et al. | | 427/142 |
| 6,221,512 B1 * | 4/2001 | Rickerby | | 428/623 |
| 6,270,852 B1 * | 8/2001 | Ulion et al. | | 427/454 |
| 6,283,715 B1 * | 9/2001 | Nagaraj et al. | | 416/241 R |
| 6,284,390 B1 * | 9/2001 | Bose et al. | | 428/615 |
| 6,296,447 B1 * | 10/2001 | Rigney et al. | | 416/241 R |
| 6,299,986 B1 * | 10/2001 | Meelu | | 428/615 |
| 6,340,500 B1 * | 1/2002 | Spitsberg | | 427/250 |
| 6,361,878 B2 * | 3/2002 | Ritter et al. | | 428/548 |

(Continued)

FOREIGN PATENT DOCUMENTS

| | | |
|---|---|---|
| EP | 0 273 852 A2 | 7/1988 |
| EP | 1 354 977 A2 | 10/2003 |
| EP | 1 967 699 A1 | 9/2008 |

*Primary Examiner* — Nathaniel Wiehe
*Assistant Examiner* — Eldon Brockman
(74) *Attorney, Agent, or Firm* — Kinney & Lange, P.A.

(57) ABSTRACT

An airfoil comprises a substrate, a residual abrasive coating and a supplemental abrasive coating. The substrate extends along a tip section of the airfoil, from a leading edge to a trailing edge. The residual abrasive coating comprises a two-phase abrasive and metal matrix material bonded to the substrate, on the tip section of the airfoil. The supplemental abrasive coating comprises a two-phase abrasive and metal matrix material bonded to the residual abrasive coating and to the substrate adjacent the residual abrasive coating, on the tip section of the airfoil. The supplemental abrasive coating restores the airfoil to a nominal tip height in the tip section.

20 Claims, 6 Drawing Sheets

(56) References Cited

U.S. PATENT DOCUMENTS

| | | | |
|---|---|---|---|
| 6,383,570 B1 * | 5/2002 | Bose et al. | 427/405 |
| 6,434,876 B1 * | 8/2002 | Wheat et al. | 427/203 |
| 6,435,830 B1 * | 8/2002 | Allen et al. | 416/193 A |
| 6,465,040 B2 * | 10/2002 | Gupta et al. | 427/142 |
| 6,532,656 B1 * | 3/2003 | Wilkins et al. | 29/889.1 |
| 6,572,981 B2 * | 6/2003 | Spitsberg | 428/629 |
| 6,725,540 B2 | 4/2004 | Bose et al. | |
| 6,730,413 B2 * | 5/2004 | Schaeffer et al. | 428/632 |
| 6,755,619 B1 | 6/2004 | Grylls et al. | |
| 6,838,190 B2 * | 1/2005 | Lee et al. | 428/670 |
| 6,921,014 B2 * | 7/2005 | Hasz et al. | 228/122.1 |
| 6,929,868 B2 * | 8/2005 | Kelly et al. | 428/680 |
| 6,933,058 B2 * | 8/2005 | Darolia | 428/610 |
| 6,984,107 B2 * | 1/2006 | Grunke et al. | 415/173.4 |
| 7,008,522 B2 * | 3/2006 | Boucard et al. | 205/115 |
| 7,078,073 B2 * | 7/2006 | Rigney et al. | 427/142 |
| 7,150,922 B2 * | 12/2006 | Spitsberg et al. | 428/632 |
| 7,169,478 B2 * | 1/2007 | Kaiser et al. | 428/633 |
| 7,186,092 B2 * | 3/2007 | Bruce et al. | 416/241 R |
| 7,244,467 B2 * | 7/2007 | Grossman et al. | 427/248.1 |
| 7,247,393 B2 * | 7/2007 | Hazel et al. | 428/680 |
| 7,264,888 B2 * | 9/2007 | Darolia et al. | 428/680 |
| 7,341,797 B2 * | 3/2008 | Spitsberg et al. | 428/701 |
| 7,354,663 B2 * | 4/2008 | Torigoe et al. | 428/701 |
| 7,544,424 B2 * | 6/2009 | Gorman et al. | 428/652 |
| 7,581,933 B2 * | 9/2009 | Bruce et al. | 416/241 R |
| 7,587,818 B2 * | 9/2009 | Gorman et al. | 29/889.1 |
| 7,597,966 B2 * | 10/2009 | Spitsberg et al. | 428/469 |
| 7,655,321 B2 * | 2/2010 | Albrecht et al. | 428/632 |
| 7,718,280 B2 | 5/2010 | Wilson | |
| 7,736,704 B2 * | 6/2010 | Chandra et al. | 427/419.1 |
| 7,836,594 B2 | 11/2010 | Rose | |
| 7,919,187 B2 * | 4/2011 | Hazel et al. | 428/446 |
| 7,922,455 B2 * | 4/2011 | Itzel et al. | 416/228 |
| 8,017,250 B2 * | 9/2011 | Anton et al. | 428/600 |
| 8,113,787 B2 * | 2/2012 | Barril et al. | 416/224 |
| 8,168,289 B2 * | 5/2012 | Seth et al. | 428/212 |
| 8,186,946 B2 * | 5/2012 | Parkos et al. | 415/173.4 |
| 8,512,874 B2 * | 8/2013 | Darolia et al. | 428/632 |
| 8,586,169 B2 * | 11/2013 | Namba et al. | 428/155 |
| 2002/0009611 A1 * | 1/2002 | Darolia et al. | 428/680 |
| 2002/0037220 A1 * | 3/2002 | Saint Ramond et al. | 416/241 R |
| 2002/0132131 A1 * | 9/2002 | Bossmann et al. | 428/615 |
| 2003/0118448 A1 * | 6/2003 | Lee et al. | 416/241 R |
| 2003/0170120 A1 * | 9/2003 | Grunke et al. | 415/174.4 |
| 2004/0170859 A1 * | 9/2004 | Darolia et al. | 428/635 |
| 2004/0197597 A1 * | 10/2004 | Schaeffer | 428/633 |
| 2005/0129511 A1 * | 6/2005 | Allen | 415/173.4 |
| 2005/0170200 A1 * | 8/2005 | Nagaraj et al. | 428/633 |
| 2005/0221109 A1 * | 10/2005 | Torigoe et al. | 428/633 |
| 2005/0235493 A1 * | 10/2005 | Philip et al. | 29/889.1 |
| 2005/0238888 A1 * | 10/2005 | Spitsberg et al. | 428/446 |
| 2005/0241147 A1 * | 11/2005 | Arnold et al. | 29/889.1 |
| 2005/0274405 A1 * | 12/2005 | Wayte et al. | 29/889.1 |
| 2006/0018760 A1 * | 1/2006 | Bruce et al. | 416/229 A |
| 2006/0093801 A1 * | 5/2006 | Darolia et al. | 428/215 |
| 2006/0137179 A1 * | 6/2006 | Gorman et al. | 29/889.1 |
| 2007/0224049 A1 * | 9/2007 | Itzel et al. | 416/241 R |
| 2007/0274837 A1 | 11/2007 | Taylor et al. | |
| 2008/0317601 A1 * | 12/2008 | Barril et al. | 416/241 R |
| 2009/0094831 A1 * | 4/2009 | Schwartz et al. | 29/889.1 |
| 2009/0246008 A1 * | 10/2009 | Kaiser et al. | 415/200 |
| 2009/0246031 A1 * | 10/2009 | Rose | 416/223 R |
| 2010/0119718 A1 * | 5/2010 | Tulyani et al. | 427/372.2 |
| 2010/0254820 A1 * | 10/2010 | Maly et al. | 416/241 R |
| 2010/0266392 A1 * | 10/2010 | Parkos et al. | 415/174.4 |
| 2010/0266417 A1 * | 10/2010 | Gorman et al. | 416/241 R |
| 2011/0103961 A1 * | 5/2011 | Glover et al. | 416/223 R |
| 2012/0096713 A1 * | 4/2012 | Manjooran et al. | 29/889.1 |

* cited by examiner

Restored Abrasive Coating — 72

| Wear | | | Wear Ratios | | Reaction Loads | | | Friction |
|---|---|---|---|---|---|---|---|---|
| Blade | Seal | Total | Linear (W/l) | Volume VWR | FZ Radial | FX Tang | FY Axial | Coef. |
| 0.0 | 10.0 | 10.0 | 0.000 | 0.000 | 6 | 3 | 1 | 0.50 |
| 0.0 | 48.0 | 48.0 | 0.000 | 0.000 | 12 | 4 | 2 | 0.33 |
| 0.0 | 45.0 | 45.0 | 0.000 | 0.000 | 15 | 5 | 3 | 0.33 |
| 0.0 | 24.0 | 24.0 | 0.000 | 0.000 | 14 | 3 | 1 | 0.21 |
| 0.0 | 25.0 | 25.0 | 0.000 | 0.000 | 12 | 5 | 2 | 0.42 |
| 0.0 | 33.0 | 33.0 | 0.000 | 0.000 | 16 | 3 | 1 | 0.19 |
| 0.0 | 34.0 | 34.0 | 0.000 | 0.000 | 14 | 3 | 1 | 0.21 |
| 0.0 | 47.0 | 47.0 | 0.000 | 0.000 | 13 | 4 | 2 | 0.31 |
| 0.0 | 46.0 | 46.0 | 0.000 | 0.000 | 10 | 2 | 0 | 0.20 |

OEM Abrasive Coating — 74

| Wear | | | Wear Ratios | | Reaction Loads | | | Friction |
|---|---|---|---|---|---|---|---|---|
| Blade | Seal | Total | Linear (W/l) | Volume VWR | FZ Radial | FX Tang | FY Axial | Coef. |
| 0.0 | 15.0 | 15.0 | 0.000 | 0.000 | 23 | 17 | 13 | 0.74 |
| 0.0 | 32.0 | 32.0 | 0.000 | 0.000 | 78 | 23 | 14 | 0.29 |
| 0.0 | 45.0 | 45.0 | 0.000 | 0.000 | 56 | 10 | 9 | 0.18 |
| 0.0 | 110.0 | 110.0 | 0.000 | 0.000 | 88 | 40 | 26 | 0.45 |
| 0.0 | 108.0 | 108.0 | 0.000 | 0.000 | 355 | 145 | 106 | 0.41 |
| 2.0 | 28.0 | 30.0 | 0.067 | 0.018 | 17 | 3 | 1 | 0.18 |
| 0.0 | 30.0 | 30.0 | 0.000 | 0.000 | 16 | 5 | 3 | 0.31 |
| 0.0 | 33.0 | 33.0 | 0.000 | 0.000 | 18 | 3 | 1 | 0.17 |
| 1.0 | 45.0 | 46.0 | 0.022 | 0.004 | 17 | 3 | 1 | 0.18 |
| 0.0 | 18.0 | 18.0 | 0.000 | 0.000 | 16 | 16 | 11 | 1.00 |

FIG. 4

ABRASIVE AIRFOIL TIP

CROSS-REFERENCE TO RELATED APPLICATION(S)

This application claims priority to U.S. Provisional Pat. App. No. 61/503,258 filed Jun. 30, 2011, which is hereby incorporated by reference in its entirety.

BACKGROUND

This invention relates generally to gas turbine engines, and specifically to turbine and compressor airfoils. In particular, the invention concerns a maintenance method for turbine airfoils with coated tip structures, including abrasive airfoil tip coatings configured to form rotary air seals.

Gas turbine engines (or combustion turbines) are built around a power core made up of a compressor, combustor and turbine, arranged in flow series with an upstream inlet and downstream exhaust. The compressor compresses air from the inlet, which is mixed which fuel in the combustor and ignited to generate hot combustion gas. The turbine extracts energy from the expanding combustion gas, and drives the compressor via a common shaft. Energy is delivered in the form of rotational energy in the shaft, reactive thrust from the exhaust, or both.

Gas turbine engines provide efficient, reliable power for a wide range of applications, including aviation, industrial power generation, and commercial heating and cooling. Small-scale engines such as auxiliary power units typically utilize a one-spool design, with co-rotating compressor and turbine sections. Larger-scale engines including jet engines and industrial gas turbines (IGTs) are generally arranged into a number of coaxially nested spools, which operate at different pressures and temperatures, and rotate at different speeds.

The individual compressor and turbine sections in each spool are subdivided into a number of stages, which are formed of alternating rows of rotor blade and stator vane airfoils. The airfoils are shaped to turn, accelerate and compress the working fluid flow, and to generate lift for conversion to rotational energy in the turbine.

Ground-based industrial gas turbines can be quite large, utilizing complex spooling systems for increased efficiency. Power is delivered via an output shaft connected to a mechanical load, such as an electrical generator, blower or pumping system. Industrial turbines can also be configured for combined-cycle operation, in which additional energy is extracted from the exhaust stream, for example in a low pressure steam turbine.

Aviation applications include turbojet, turbofan, turboprop and turboshaft engines. Turbojet engines are an older design, in which thrust is generated primarily from the exhaust. Modern fixed-wing aircraft generally employ turbofan and turboprop engines, in which the low pressure spool is coupled to a propulsion fan or propeller. Turboshaft engines are used on rotary-wing aircraft, including helicopters.

Turbofan engines are commonly divided into high and low bypass designs. High bypass turbofans generate thrust primarily from the fan, which drives airflow through a bypass duct oriented around the engine core. Low-bypass turbofans generate proportionally more thrust from the exhaust flow. This design provides greater specific thrust but incurs costs in noise and fuel efficiency, and is primarily used on supersonic fighters and other high-performance aircraft. Unducted (open rotor) turbofans and ducted turboprop engines are also known, including counter-rotating and aft-mounted configurations.

Gas turbine engine performance requires maintaining precise clearance between the various rotating and stationary components, particularly for rotor blade and stator vane airfoils. In the airfoil tip region, abrasive/abradable coatings are sometimes used to provide a rotating seal, increasing efficiency by reducing blow-by and other losses. Abrasive seals can be service-limiting components, however, typically requiring regular inspection and service.

SUMMARY

This invention concerns an airfoil with an abrasive tip, and a method for making the airfoil. The airfoil includes a substrate, a residual abrasive coating and a supplemental abrasive coating.

The substrate extends along a tip section of the airfoil, from a leading edge to a trailing edge. The residual abrasive coating includes a two-phase abrasive and metal matrix material, which is bonded to the substrate in the tip section of the airfoil. The supplemental abrasive coating also includes a two-phase abrasive and metal matrix material, which is bonded to the residual abrasive coating, and to the substrate adjacent the residual abrasive coating. The supplemental abrasive coating restores the tip section of the airfoil to a nominal tip height.

BRIEF DESCRIPTION OF THE DRAWINGS

FIG. 4 is a compilation of wear data from a test rig, comparing the restored abrasive tip to an original (OEM) abrasive tip.

DETAILED DESCRIPTION

Figure 1:
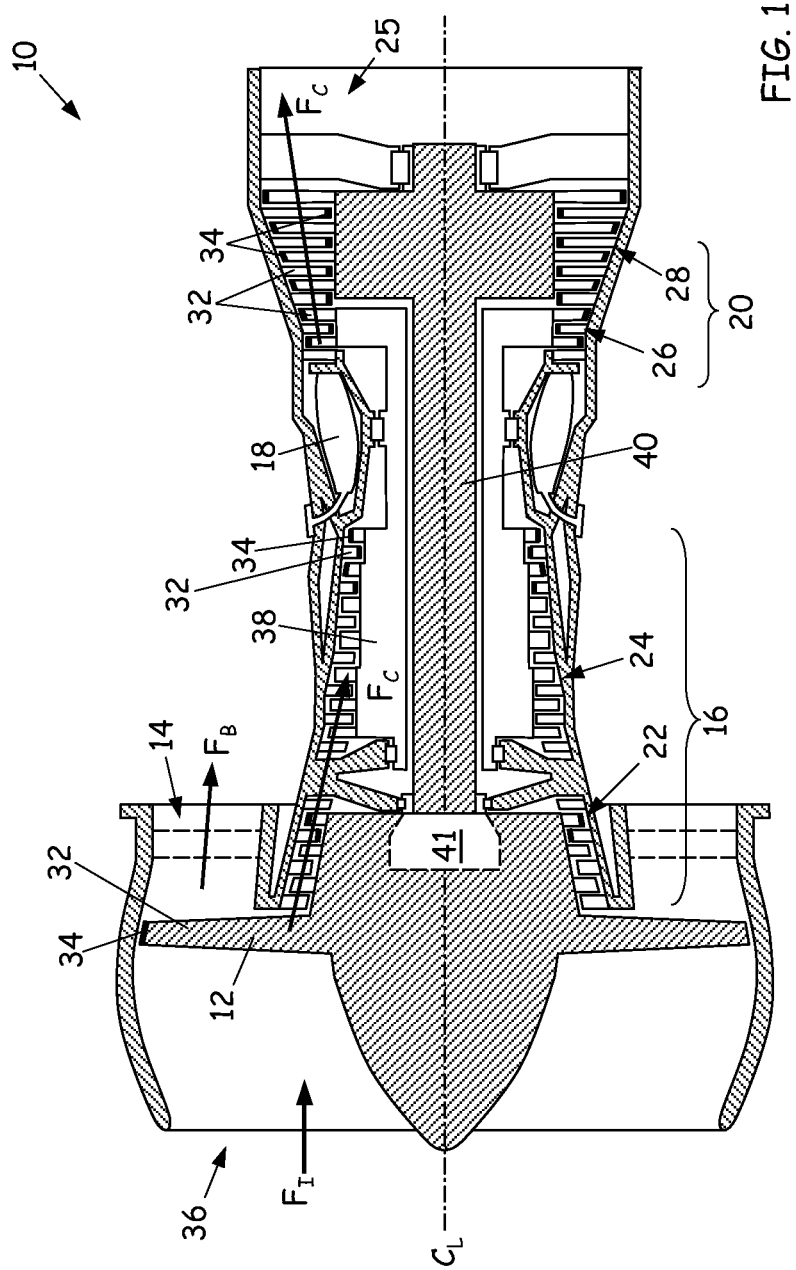
FIG. 1 is a cross-sectional view of a gas turbine engine with abrasive-tipped airfoils.

FIG. 1 is a cross-sectional view of gas turbine engine 10, in a turbofan configuration. In this configuration, gas turbine engine 10 includes propulsion fan 12, bypass duct 14, compressor section 16, combustor 18 and turbine section 20.

Compressor section 16 includes low pressure compressor (LPC) 22 and high pressure compressor (HPC) 24. Turbine section 20 comprises high pressure turbine (HPT) 26 and low pressure turbine (LPT) 28.

High and low pressure turbines 26 and 28 each include a number of rotor blade or stator vane airfoils 32, with abrasive tips 34 to maintain air seals. In some designs, airfoils 32 with abrasive tips 34 are also utilized in the compressor section, for example in low pressure compressor 22 or high pressure compressor 24, or in fan 12. A supplemental abrasive coating is applied to airfoils 32 in order to restore abrasive tips 34 to a nominal height, reducing downtime and lowering maintenance costs as described below.

In operation of gas turbine engine 10, air flow $F_I$ from inlet 36 is accelerated by fan 12, which generates thrust by accelerating bypass flow $F_B$ through fan duct 14. Core flow $F_C$ is compressed in compressor section 16, then mixed with fuel in combustor 18 and ignited to generate combustion gas. The combustion gas drives turbine section 20, which is rotationally coupled to compressor section 16 and fan 12. Expanded combustion gases exit turbine engine 10 via exhaust nozzle 25, which is shaped to generate additional thrust from the exhaust flow.

In the two-spool, high bypass configuration of FIG. 1, high pressure turbine 26 is coupled to high pressure compressor 24 via high pressure (HP) shaft 38, forming the HP spool or high spool. Low pressure turbine 28 is coupled to low pressure compressor 22 via low pressure (LP) shaft 40, forming the LP spool or low spool.

Fan 12 may function as a first-stage compressor for gas turbine engine 10, with low pressure compressor 22 operating as an intermediate pressure compressor or booster, or absent altogether. In advanced turbofan designs, LP shaft 40 is coupled to fan 12 via geared drive mechanism 41, providing additional fan speed control for increased efficiency and reduced engine noise.

Alternatively, gas turbine engine 10 is configured either as a high-bypass or low-bypass turbofan engine, a turbojet, turboshaft or a turboprop engine, or a multiple-spool industrial gas turbine. Gas turbine engine 10 also incorporates one-spool, two-spool and three-spool geometries, in both co-rotating and counter-rotating designs, with shaft and spool configurations varying accordingly.

Current maintenance methodology requires that abrasive airfoil tips be fully remanufactured in order to restore the blade to nominal condition. In this process, all of the residual abrasive coating material is removed and the substrate is ground down, resulting in an airfoil with a smaller radial dimension (that is, a reduced airfoil height). To restore the airfoil height, a new tip is welded to the substrate, and new abrasive coating material is applied to the welded tip.

In order to completely remove the existing abrasive matrix, that is, the substrate is ground below its minimum height dimension, requiring a new tip to be welded onto the airfoil. To restore the nominal height, the new welded tip must also be ground to the required dimension, before adding the new abrasive coating. This is a time-consuming and expensive maintenance process, and requires special tooling and repair facilities.

In a modified technique, abrasive tips 34 are restored to nominal dimension by applying a new abrasive tip material over the existing (residual) abrasive matrix. The restoration process includes a visual inspection of each airfoil 32, in order to determine which can be repaired by the new method, and which have substantial cracks or other damage to the substrate, and instead require a complete remanufacture of abrasive tip 34. In some applications, additional metallographic standards are also used to determine suitability.

For airfoils 32 passing preliminary inspection, abrasive tip 34 is ground to the specified length, and the supplemental abrasive matrix material is applied. Both the residual matrix material and any exposed substrate are freshly ground in this process, allowing for a sound, strong bond between the existing substrate and the residual matrix, and the newly applied abrasive tip material.

This technique allows maintenance personnel to determine the feasibility for restoring abrasive tip 34 on an airfoil-by-airfoil basis, without requiring that each and every airfoil 32 be ground down and welded to restore nominal dimensions. For many or most airfoils 32, in fact, there is no need to completely remove abrasive tip 34, and no need to grind the substrate material to a dimension that requires a new welded tip.

Other airfoils with substantial substrate damage, for example cracks, pitting, etc., are subject to the complete rebuild process. This reduces maintenance time and costs by adapting maintenance and manufacturing to the condition of each individual airfoil 32, rather than simply reconstructing every abrasive tip 34 in gas turbine engine 10, regardless of condition.

Figure 2A:
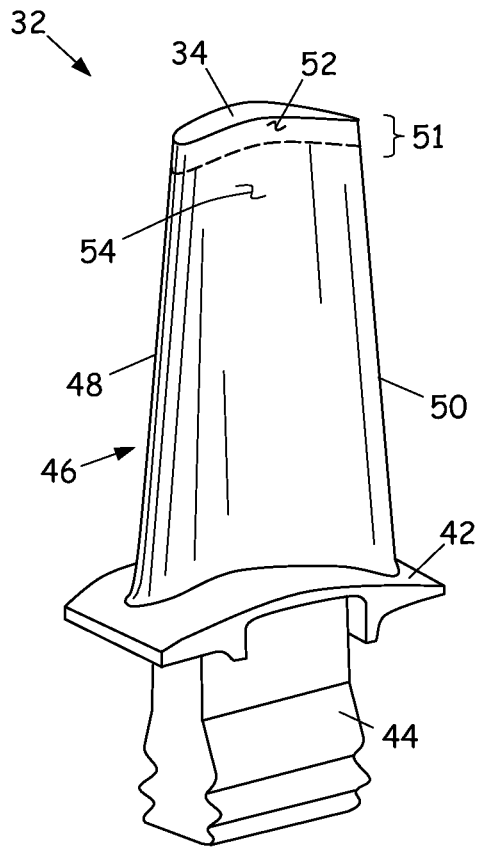
FIG. 2A is a perspective view of an abrasive-tipped airfoil for the gas turbine engine, in a rotor blade configuration.

FIG. 2A is a perspective view of airfoil 32 for gas turbine engine 10, in a rotor blade configuration. In this configuration, airfoil 32 is mounted on platform 42, with a fir tree, dovetail or other root attachment 44 configured to secure airfoil 32 against centripetal loading at high rotational speeds.

Airfoil portion (or section) 46 extends along concave (high pressure) and convex (low pressure or suction) surfaces from leading edge 48 to trailing edge 50, and from platform 42 to tip region 51. In general, airfoils 32 may also include internal and external structures for cooling, weight reduction and other functions, including internal passages, impingement and film cooling holes, and additional structures.

Tip region (or tip section) 51 of airfoil 32 is positioned to maintain clearance between abrasive tip 34 and a stationary turbine or fan casing, or a compressor housing (see FIG. 1). Typically, the casing or housing surface is provided with a complementary abradable coating, for example a ceramic seal coating forming a blade outer air seal (BOAS) or an inner air seal for a cantilevered vane. As airfoil 32 rotates past the turbine casing or compressor housing, abrasive tip 34 abrades the abradable coating material to maintain a rotating air seal, reducing tip losses and blowby of compressed air, combustion gas and other working fluids.

Abrasive tip 34 is formed by bonding abrasive coating 52 to airfoil substrate 54 in tip region 51. Suitable abrasive coatings 52 include two-phase materials with a discrete abrasive phase embedded in a continuous matrix phase. In one application, for example, abrasive coating 52 is formed of abrasive boron nitride (ABN) or cubic boron nitride (CBN) particles (grits) embedded in a continuous matrix material. Alternatively, other abrasives are used, such as aluminum oxide or zirconium oxide.

The matrix material is selected for bonding properties and chemical compatibility with the material of airfoil substrate 54. For high-temperature nickel and cobalt-based alloys and superalloys, abrasive coating 52 uses a comparable high-temperature metal matrix, for example a nickel-chromium-aluminum-yttrium (NiCrAlY) alloy, or a nickel or chromium metal or metal alloy. In other applications, substrate 54 is formed of aluminum or titanium, and abrasive coating 52 uses a compatible aluminum or titanium alloy. Where airfoil 32 includes a composite substrate material 54, abrasive coating 52 utilizes a compatible composite matrix material, for example a graphite or polymer-based matrix material.

Figure 2B:
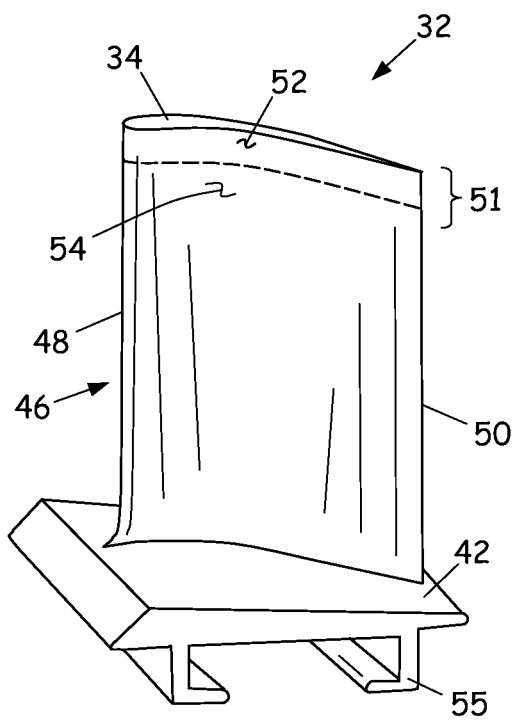
FIG. 2B is a perspective view of an abrasive-tipped airfoil for the gas turbine engine, in a stator vane configuration.

FIG. 2B is a perspective view of an airfoil 32, in a stator vane configuration. In this configuration, platform 42 includes hooks or other root attachment structures 55, which are configured to secure airfoil 32 to a stationary structure such as a compressor housing or turbine casing.

FIG. 2B shows airfoil 32 in an unshrouded configuration, with platform 42 mounted to a stationary turbine casing or compressor housing. In cantilevered vane designs, platform 42 is mounted to a radially outer housing or casing structure, and tip region 51 of airfoil 32 is oriented radially inward of platform 42. In this configuration, abrasive tip 34 maintains clearance with respect to a rotary component such as a compressor rotor or turbine disk. The outer surface of the disk or rotor can be provided with an abradable coating material, as described above, with abrasive tip 34 positioned in rotational contact with the abradable coating to maintain a rotating air seal.

Abrasive tip coating 52 is subject to wear during engine operations, requiring regular replacement and overhaul. The current practice of grinding back the airfoil tip, weld restoring the airfoil tip length, grinding the airfoil to finished length, and reapplying the abrasive tip coating is time consuming and expensive, as described above. The limited work scope restoration techniques described here eliminate the need for welding, and reduce the number of grind operations. In particular, tip region 51 is only ground back enough to accommodate the application of a new or supplementary abrasive coating, reducing maintenance time and cost, and improving throughput.

Figure 3A:
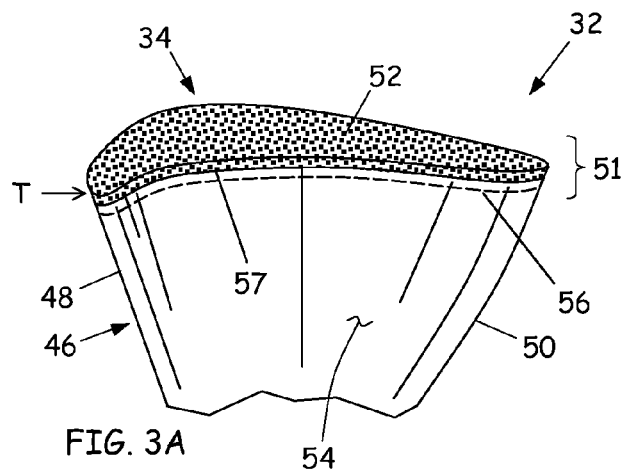
FIG. 3A is a perspective view of the airfoil, showing the abrasive tip.

FIG. 3A is a perspective view of airfoil 32 for gas turbine engine 10, showing abrasive coating 52 on abrasive tip 34. Suitable abrasive coatings 52 are formed of a two-phase abrasive particle and metal matrix material, described above.

To form abrasive tip 34 on airfoil 32, substrate 54 is cleaned using a combination of wet or dry abrasives, rinses, ultrasonic processes, and chemical or acid baths. Airfoil 32 is masked to expose airfoil tip region 51, above minimum airfoil height 56. The exposed surface of substrate 54, at original (or nominal) substrate height 57, is prepared by surface treatments including light sanding, scrubbing or etching, or a combination thereof.

Suitable methods for applying abrasive coating 52 to airfoil substrate 54 include electroplating, for example by immersing the target area of airfoil 32 in an electroplating bath including a CBN or ABN slurry with a nickel, chromium or NiCrAlY material to deposit the two-phase abrasive particulate and metal matrix. Airfoil 32 is then heated to fix abrasive coating 52 onto abrasive airfoil tip 34, for example at a temperature of 300-400° C. (about 570-750° F.) for one hour or more. In some applications, a nickel, chromium, NiCrAlY or other strike layer is plated onto substrate 54 first, in order to form a seed layer, followed by the remainder of abrasive coating 52.

In these processes, a typical specified nominal thickness T for abrasive coating 52 is about 5 mil (0.005 inch, or 0.13 mm), with 60-80% grit encapsulation, so that the abrasive (particulate) phase is exposed at the surface of abrasive tip 34. Alternatively, the thickness of abrasive coating 52 is about 2-5 mil (about 0.05-0.13 mm), or about 5-10 mil (about 0.13-0.25 mm) or more. Encapsulation also varies, for example from 70-90%, or between 50% and 100%.

Figure 3B:
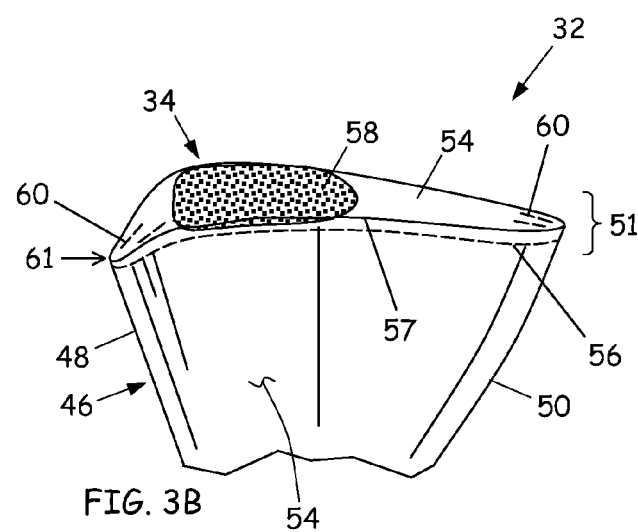
FIG. 3B is a perspective view of the airfoil, showing wear on the abrasive tip.

FIG. 3B is a perspective view of airfoil 32, showing wear on abrasive tip 34 due to engine running. Wear processes include cracking, microcracking, pitting, abrasion and chamfering, resulting in partial or full removal of the original abrasive coating 52 (FIG. 3A), leaving residual (engine-run) abrasive coating 58.

Engine wear processes leave portions of residual abrasive coating 58 with less than the specified nominal thickness, and expose adjacent portions of substrate 54 in tip region 51. As a result, surface wear or damage features 60 such as cracks, microcracks, pitting, abrasion and chamfering appear in residual abrasive coating 58, and in adjacent portions of substrate 54. Damage is particularly common across tip region 51, where airfoil 32 and substrate 54 are subject to direct contact with adjacent casing, housing or rotor structures.

To perform maintenance on airfoil 32 without full reconstruction of abrasive tip 34, tip region 51 is inspected to determine whether any damage or wear features 60 penetrate through nominal substrate height 57 to below minimum acceptable height 56 of airfoil substrate 54. In one application, the damage inspection is visual. Alternatively, a combination of visual, optical sensor, x-ray, ultrasonic and dye penetration techniques are used to determine the size and extent of wear features 60.

After inspection, the surface of substrate 54 is treated by machining or grinding to remove surface wear features 60. If features 60 do not extend in depth below minimum acceptable height 56, and abraded height 61 is above minimum height 56 after machining, everywhere along tip region 51 between leading edge 48 and trailing edge 50, then abrasive coating 52 can be restored using the techniques described here. If features 60 extend below minimum acceptable height 56, or if machining reduces substrate 54 below minimum height 56, anywhere along tip region 51 between leading edge 48 and trailing edge 50, full reconstruction of abrasive tip 34 may be required.

Figure 3C:
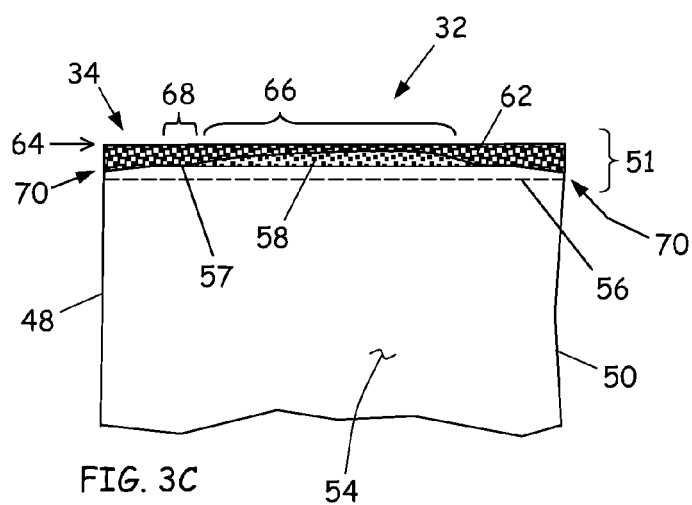
FIG. 3C is a cross-sectional view of the airfoil, showing a restored abrasive tip.

FIG. 3C is a cross-sectional view of airfoil 32, illustrating the structure of restored abrasive tip 34. As restored, abrasive tip 34 includes original substrate 54, residual abrasive coating 58, and new (supplemental) abrasive coating 62, such that abrasive tip 34 is restored to originally specified (or nominal) tip height 64.

After grinding to remove cracks and other wear or damage features, airfoil 32 is further inspected, as described above, to ensure that the height of substrate 54 remains above nominal minimum 56, everywhere along tip region 51 between leading edge 48 and trailing edge 50. Airfoil 32 is masked to expose tip region 51, and residual abrasive coating 58 and adjacent portions of substrate 54 are prepared for airfoil tip restoration by one or more surface treatments including sanding, scrubbing, etching, wiping, washing and rinsing.

To restore abrasive tip 34 to specified nominal height 64, supplemental abrasive coating 62 is applied and bonded to residual abrasive coating 58, and to the exposed portions of substrate 54 adjacent residual abrasive coating 58. Typically, supplemental abrasive coating 62 is formed of the same or a similar two-phase abrasive matrix material as residual coating 58 (and original coating 52 of FIG. 3A), and supplemental coating 62 is applied by similar electrochemical methods, followed by heating.

The result is a layered structure in tip region 51 of airfoil 32, with substrate 54 on the bottom, followed by residual abrasive coating 58 and supplemental abrasive coating 62, which restores abrasive tip 34 to nominal tip height 64. In contrast to other airfoil tip reconstruction methods, airfoil substrate 54 is comprised of an unwelded metal alloy in tip region 51, for example a single-crystal metal alloy or a directionally solidified metal alloy, rather than a welded-on tip material.

Supplemental abrasive coating 62 restores abrasive tip 34 of to nominal height 64 in three regions, variously positioned across airfoil tip region 51 from leading edge 48 to trailing edge 50. First, where residual abrasive coating 58 remains (region 66), supplemental abrasive coating 62 extends from the height of residual abrasive coating 58 to nominal tip height 64, restoring the abrasive material to the specified nominal thickness. Second, where the original abrasive coating has been removed and residual abrasive coating 58 is not present, but there are no substantial surface damage features (region 68), supplemental abrasive coating 62 extends from exposed substrate 54 at approximately nominal substrate height 57 to nominal tip height 64, with substantially the same nominal thickness.

Third, in some regions substrate 54 is reduced below nominal substrate height 57, either by grinding to remove cracks and other wear features, or due to rubbing or chamfering during engine operations. In these regions (e.g., regions 70 at leading edge 48 and trailing edge 50), supplemental abrasive coating 62 extends from resurfaced substrate 54 to nominal tip height 64, where resurfaced substrate 54 is at a level above minimum height 56, but below nominal substrate height 57.

In each of these three regions, the abrasive material (residual abrasive coating 58 and supplemental abrasive coating 62) is restored to at least nominal thickness T, across airfoil tip region 51 from leading edge 48 to trailing edge 50. In the third region, supplemental abrasive coating 62 may have greater than specified nominal coating thickness T, in order to restore abrasive airfoil tip 34 to nominal height 64 in those regions 70 where substrate 54 is worn or machined below nominal height 57.

FIGS. 3A-3B illustrate a limited work scope ("light") maintenance and restoration technique, incorporating the existing (residual) abrasive coating 58 and new supplemental (restored) abrasive coating 62. The intent is to restore abrasive airfoil tip 34 at reduced cost, with performance equal to the original equipment manufacture (OEM) abrasive coating. This technique is also referred to as "tip-on-tip" maintenance or repair, with a demonstrated ability to restore abrasive tip 34 to an original performance condition, or better, preserving the integrity and functionality of airfoil 32 without requiring the complete reconstruction of airfoil tip region 51.

The restoration technique was tested by evaluating OEM and restored airfoil tips in a test rig. In one particular application, the test utilized airfoils 32 with a PWA 293-1 Turbotip™ coating, rubbing against a PWA 281 ceramic seal. Both coating systems are available from Pratt & Whitney of East Hartford, Conn., a United Technologies Company.

Rub rig testing confirms that the limited scope repair (restored abrasive tip 34 of FIG. 3C, with residual abrasive coating 58 and supplemental abrasive coating 62) performs at least as well as the OEM system (original abrasive tip 34 of FIG. 3A, with original abrasive coating 52). Relative wear rates and reaction loads are comparable for both coatings, and both coatings show the ability to abrade the ceramic seal (abradable) material with minimal to no airfoil tip wear.

Reaction loads were typically low, and neither OEM abrasive coating 52 (FIG. 3A) nor supplemental abrasive coating 62 (FIG. 3C) showed a tendency to spall. Based on these results, airfoils 32 with restored abrasive tips 34 are suitable for application to high pressure turbine stages, where operating conditions are the most severe, and for other turbine, fan and compressor stages, including turbofan, turboshaft, turboprop, and industrial gas turbine engine applications.

FIG. 4 is a compilation of wear data from the test rig, comparing the restored abrasive airfoil tip to an original (OEM) abrasive tip. Top data set 72 shows wear depth, wear ratios, reaction loads and friction coefficients (all in arbitrary units) for the restored abrasive airfoil tip system, and bottom data set 74 shows the same data for the OEM abrasive tip system.

To produce the data in FIG. 4, ten turbine airfoil tips were coated with an OEM (Turbotip™) process, and ten airfoils were coated with a limited work scope reconstructed abrasive tip, as described above. A section of each airfoil was cut out via wire EDM (electrical discharge machining), in order to provide samples for evaluation in the rub rig.

For these particular test applications, the PWA 293-1 (Turbotip™) abrasive airfoil tip coating system includes a mixture of CBN grits entrapped (encapsulated or embedded) in a metal matrix, and the PWA 281 air seal system includes an abradable ceramic seal coating material. Each sample had an abrasive coating surface approximately 250 mils (0.25 inch, or about 6.4 mm) wide. Static abradable air seal specimens were provided, incorporating a 100 mil (0.10 inch, or about 2.5 mm) thick ceramic coating on sheet stock. Each abradable air seal specimen accommodated up to eight rub events, and one airfoil tip sample was used for each test.

The test rub rig incorporates an air turbine driven disk with slots to hold the airfoil tip samples. A static holder drives an abradable ceramic-coated (air seal) specimen into the rotating disk, in order to complete the rub interaction. Rotor speed was set to produce a tip speed of 500 ft/sec (about 150 m/s), with an interaction rate of 4 mil/sec (0.004 inch/sec, or about 0.10 mm/sec). The interaction depth was varied from a light rub condition of 10-15 mil (0.010-0.015 inch, or 0.25-0.38 mm) to as much as 100 mil (0.10 inch, or 2.54 mm), resulting in complete rub-through of the abradable ceramic coating, with additional testing with an interaction depth of 30-50 mil (0.030-0.050 inch, or 0.76-1.27 mm). Rub reaction loads are measured with a force transducer mounted to the static holder, with disk rotational speed, interaction rate, and interaction depth controlled throughout each test.

For the restored ("limited work scope") abrasive tip of data set 72, one test (blacked out) resulted in airfoil tip ejection prior to any rub interaction. For the other tests, wear on the abrasive airfoil tip was substantially zero, and seal wear ranged from 10 to 48, in arbitrary units, with an average of 34.7. As a result, the wear ratios (tip wear over total wear, including airfoil tip plus seal), were all zero. Measured radial reaction loads FZ ranged from 6 to 16, tangential reaction loads FX ranged from 2 to 5, and axial reaction loads FY ranged from 0 to 3, also in arbitrary units, with averages of 12.4, 3.6 and 1.4, respectively. The (dimensionless) friction coefficient FX/FZ ranged from 0.19 to 0.50, with an average of 0.30.

For the OEM abrasive tip of data set 74, five of the tests resulted in airfoil tip ejection, after wear interactions, and two of the tests rubbed completely through the abradable air seal coating. Wear on the abrasive airfoil tip ranged from zero to 2.0, with an average of 0.3, and seal wear ranged from 15.0 to 110, with an average of 46.4. The wear ratio ranged from zero to 0.067 (linear), and from zero to 0.018 (volume), with averages of 0.009 and 0.002, respectively. Radial, tangential and axial loads FZ, FX and FY ranged from 16-355, 3-145 and 1-106, with averages of 68.4, 26.5 and 18.5, respectively. Friction coefficient FX/FZ ranged from 0.18 to 1.00, with an average of 0.39.

The data in FIG. 4 verify the integrity and performance of the restored abrasive airfoil tip technique. For this series of tests, the airfoil tip sample was mounted in a radial slot on the rotor and held in place with set screws. Airfoil tip wear was determined by measuring and weighing the airfoil tip samples prior to testing, and after rubbing. The reaction loads were measured in real time, using a three-directional force transducer with peak values determined post test.

To reduce bias and provide side-by-side comparisons, testing alternated between OEM coated parts and restored airfoil tips. Visual observations of the airfoil tip and air seal ceramic coatings showed no distinction between the two airfoil tip coatings. In particular, all the tip samples remained intact after testing, with neither the restored abrasive tip nor the OEM coating showing any tendency to spall due to rubbing.

Figure 5A:
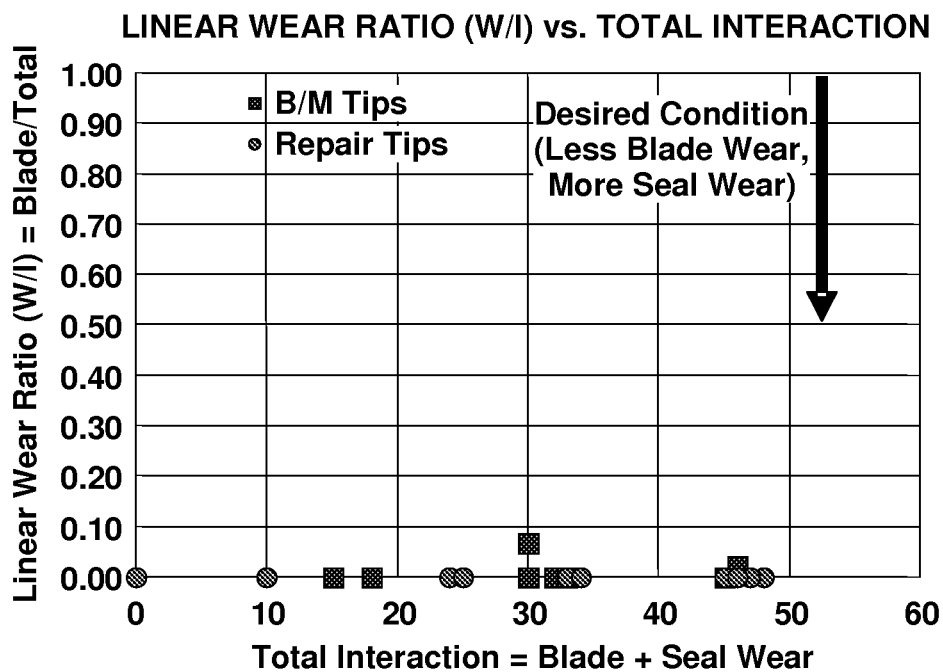
FIG. 5A is a plot of linear wear ratio versus total interaction depth, comparing the restored abrasive tip to an OEM tip.

FIG. 5A is a plot of linear wear ratio versus total interaction depth, comparing the restored abrasive tip (circles) to an OEM tip (squares). The total interaction depth is scaled in arbitrary units along the horizontal axis, and includes wear and the airfoil tip and air seal coating. The linear wear ratio is scaled along the vertical axis, in terms of wear depth on the airfoil tip compared to the total (airfoil tip plus seal).

As shown in FIG. 5A, the desired performance condition corresponds to a low wear ratio, with less wear on the airfoil tip as compared to the air seal. Based on this criterion, the restored airfoil tip performs comparably to, or better than, the OEM airfoil tip, exhibiting less wear on the abrasive coating.

Figure 5B:
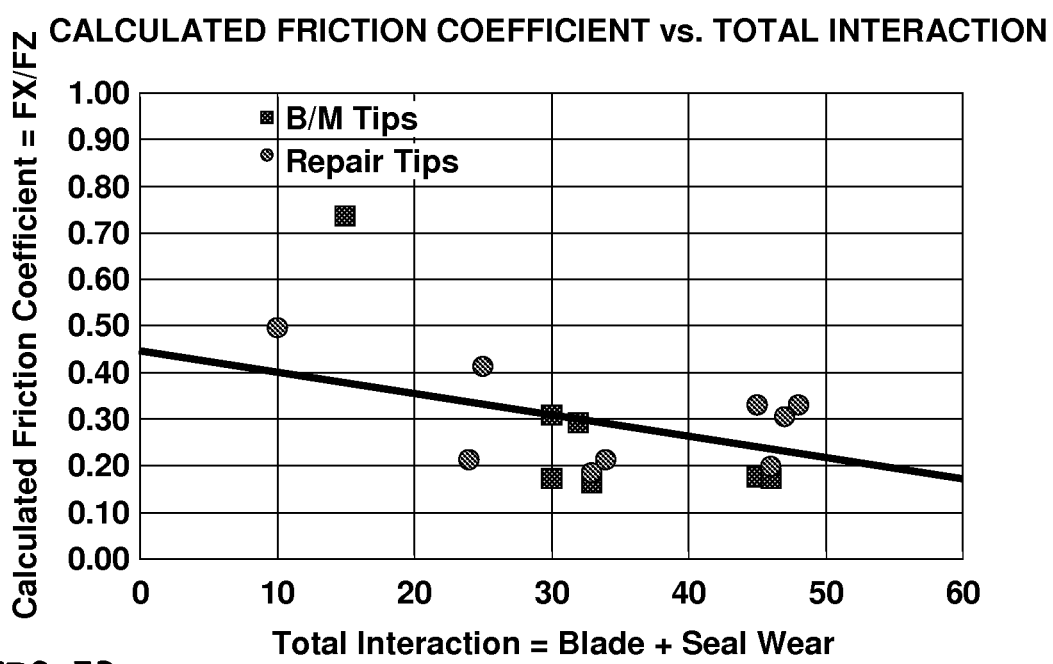
FIG. 5B is a plot of friction coefficient versus total interaction depth, comparing the restored abrasive tip to an OEM tip.

FIG. 5B is a plot of friction coefficient versus total interaction depth, comparing the restored abrasive tip (circles) to an OEM tip (squares). The total interaction depth is scaled along the horizontal axis, as described above. The friction coefficient is scaled on the vertical axis, in dimensionless units based on the ratio of tangential load FX to radial load FZ.

As shown in FIG. 5B, friction coefficients for the restored airfoil tips and OEM airfoil tips are comparable. Both data sets may exhibit a tendency for reduced friction coefficient as a function of total interaction depth.

Figure 6A:
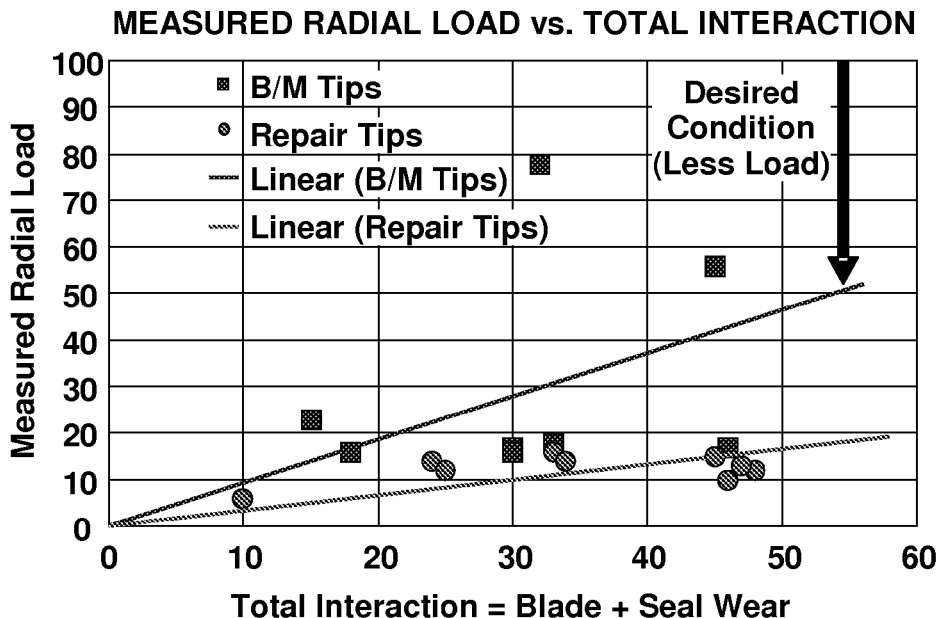
FIG. 6A is a plot of radial load versus total interaction depth, comparing the restored abrasive tip to an OEM tip.

FIG. 6A is a plot of radial load versus total interaction depth, comparing the restored abrasive tip (circles) to an OEM tip (squares). Radial load FZ is scaled on the vertical axis, with total interaction depth on the horizontal, both in arbitrary units.

Figure 6B:
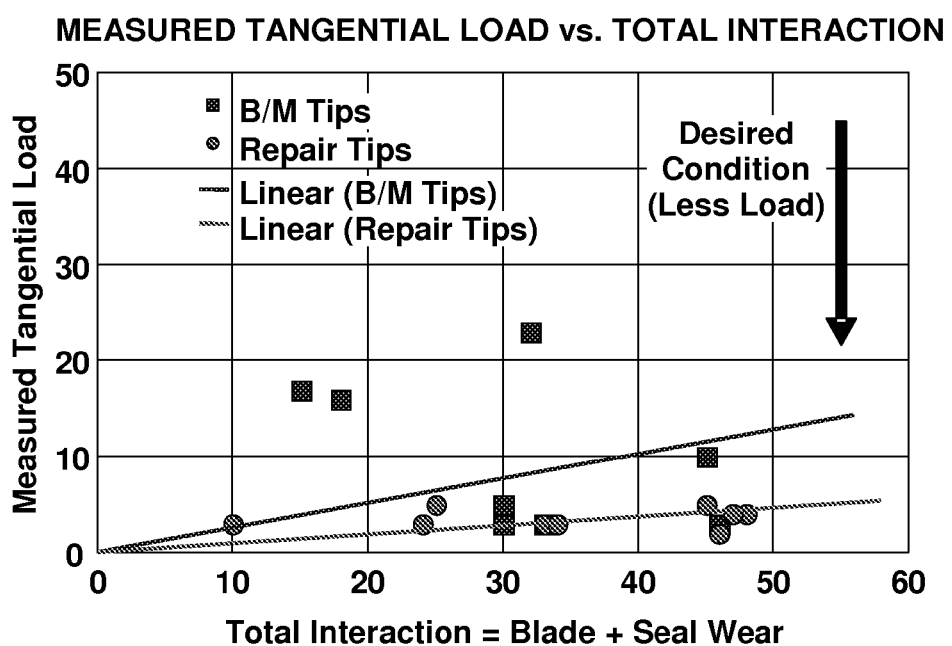
FIG. 6B is a plot of tangential load versus total interaction depth, comparing the restored abrasive tip to an OEM tip.

FIG. 6B is a plot of tangential load versus total interaction depth, comparing the restored abrasive tip (circles) to an OEM tip (squares). Tangential load FX is scaled on the vertical axis, with total interaction depth on the horizontal, both in arbitrary units.

As shown in FIGS. 6A and 6B, the desired performance condition corresponds to lower load. Based on this criterion, the restored airfoil tip performs comparably to, or better than, the OEM airfoil tip, with lower radial loading FZ and lower tangential loading FX. Both data sets may exhibit a tendency for increased loading as a function of total interaction depth, but loading on the restored airfoil tip remains lower than loading on the OEM tip in this region, in both the radial and tangential directions. Axial loading FY is also lower, as shown in FIG. 4.

As described above, abrasive airfoil tip reconstruction techniques can be successfully applied to substrates that exhibit low levels of distress, with surface wear features restricted to a particular depth range above a minimum airfoil height. These techniques result in lower cost, faster maintenance and repair times, and enhanced future reparability. Abrasive tip restoration also extends part life by avoiding welding, reducing the propensity of single crystal and directionally solidified substrates to crack during the maintenance process. Microcracks produced during welding also tend to grow during engine operation, requiring additional repair or replacement.

While this invention has been described with reference to exemplary embodiments, it will be understood by those skilled in the art that various changes may be made and equivalents may be substituted for elements thereof without departing from the spirit and scope of the invention. In addition, modifications may be made to adapt a particular situation or material to the teachings of the invention, without departing from the essential scope thereof. Therefore, the invention is not limited to the particular embodiments disclosed herein, but includes all embodiments falling within the scope of the appended claims.

The invention claimed is:

1. An airfoil comprising:
   a substrate, the substrate extending along a tip section of the airfoil from a leading edge to a trailing edge; and
   a residual abrasive coating on the tip section of the airfoil, the residual abrasive coating comprising a two-phase abrasive and metal matrix material bonded to the substrate;
   a supplemental abrasive coating on the tip section of the airfoil, the supplemental abrasive coating comprising a two-phase abrasive and metal matrix material bonded to the residual abrasive coating and to the substrate adjacent the residual abrasive coating;
   wherein the supplemental abrasive coating restores the tip section of the airfoil to a nominal tip height.

2. The airfoil of claim 1, wherein the residual abrasive coating and the supplemental abrasive coating each comprise discrete boron nitride particles embedded in a continuous metal matrix.

3. The airfoil of claim 1, wherein the substrate comprises an unwelded metal alloy in the tip section.

4. The airfoil of claim 1, wherein the substrate comprises a single crystal metal alloy or a directionally solidified metal alloy in the tip section.

5. The airfoil of claim 1, wherein the residual abrasive coating exhibits a wear feature, such that the residual abrasive coating has less than a nominal thickness along the tip section.

6. The airfoil of claim 5, wherein the supplemental abrasive coating restores the nominal thickness along across the tip region, from the leading edge to the trailing edge.

7. The airfoil of claim 1, wherein the substrate adjacent the residual abrasive coating has a wear feature, such that the substrate has less than a nominal height along the tip section.

8. The airfoil of claim 7, wherein the supplemental abrasive coating restores the airfoil to the nominal height across the tip section, from the leading edge to the trailing edge.

9. The airfoil of claim 1, wherein the supplemental abrasive coating provides reduced average reaction loading due to rubbing, as compared to the residual abrasive coating.

10. The airfoil of claim 1, wherein the supplemental abrasive coating provides reduced average wear due to rubbing, as compared to the residual abrasive coating.

11. A method comprising:
    surface treating a residual abrasive coating, the residual abrasive coating comprising abrasive particles in a metal matrix material bonded to an airfoil substrate;
    surface treating the airfoil substrate adjacent the residual abrasive coating;
    applying a supplemental abrasive coating to the residual abrasive coating, the supplemental abrasive coating comprising abrasive particles in a metal matrix material; and
    applying the supplemental abrasive coating to the airfoil substrate adjacent the residual abrasive coating;
    wherein the supplemental abrasive coating is bonded to the residual abrasive coating and to the airfoil substrate adjacent the residual abrasive coating.

12. The method of claim 11, wherein the residual abrasive coating includes a wear feature, such that the residual abrasive coating has less than a nominal thickness in a tip region of the airfoil substrate.

13. The method of claim 12, wherein applying the supplemental abrasive coating restores a nominal abrasive coating thickness across the tip region, from a leading edge of the airfoil substrate to a trailing edge of the airfoil substrate.

14. The method of claim 11, wherein the airfoil substrate adjacent the residual abrasive coating includes a wear feature, such that the airfoil substrate has less than a nominal substrate height in a tip region.

15. The method of claim 14, further comprising determining a depth of the wear feature, wherein the depth does not extend below a minimum height of the airfoil substrate.

16. The method of claim 15, further comprising machining the airfoil substrate to remove the wear feature.

17. The method of claim 16, wherein applying the supplemental abrasive coating restores a nominal tip height across the tip region, from a leading edge of the airfoil substrate to a trailing edge of the airfoil substrate.

18. The method of claim 11, wherein the residual abrasive coating and the supplemental abrasive coating each comprise boron nitride particles in a discrete phase and a metal matrix material in a continuous phase.

19. The method of claim 11, wherein the steps of applying the supplemental abrasive coating comprise electroplating the supplemental abrasive coating to the residual abrasive coating and to the airfoil substrate adjacent the residual abrasive coating.

20. The method of claim 11, wherein the supplemental abrasive coating is applied to an unwelded tip region of the airfoil substrate.

* * * * *